(12) United States Patent
Guard et al.

(10) Patent No.: US 7,578,478 B2
(45) Date of Patent: Aug. 25, 2009

(54) ATTACHING PANELS TO SUPPORT STRUCTURES IN AN AIRCRAFT

(75) Inventors: Peter S. Guard, Sammamish, WA (US); Karen L. Hills, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/145,748

(22) Filed: Jun. 25, 2008

(65) Prior Publication Data

US 2008/0258007 A1 Oct. 23, 2008

Related U.S. Application Data

(60) Division of application No. 11/067,076, filed on Feb. 25, 2005, now Pat. No. 7,416,157, which is a continuation of application No. 10/418,400, filed on Apr. 18, 2003, now Pat. No. 6,871,822.

(51) Int. Cl.
    *B64C 1/00* (2006.01)
(52) U.S. Cl. ..................................... 244/131
(58) Field of Classification Search ............... 244/131, 244/124, 119; 403/338, 335, 315–317, 230, 403/240, 243; 52/127.6, 127.8, 282.2, 282.4
    See application file for complete search history.

(56) References Cited

U.S. PATENT DOCUMENTS

| | | | |
|---|---|---|---|
| 2,219,714 A | 10/1940 | Sperry | |
| 2,877,970 A | 3/1959 | Albertine et al | |
| 3,791,096 A | 2/1974 | Epperlein | |
| 3,875,717 A | 4/1975 | Moeller | |
| 3,882,652 A | 5/1975 | Marchello | |
| 3,976,269 A | 8/1976 | Gupta | |
| D248,924 S | 8/1978 | Curtis | |
| 4,475,325 A | 10/1984 | Veldhoen | |
| 4,587,774 A | 5/1986 | Wendt | |
| 4,671,470 A | 6/1987 | Jonas | |
| 5,647,181 A | 7/1997 | Hunts | |
| 5,806,797 A | 9/1998 | Micale | |
| 5,864,997 A | 2/1999 | Kelly | |
| 5,876,024 A | 3/1999 | Hain | |
| 6,444,291 B2 | 9/2002 | Phillips et al. | |
| 6,712,316 B2 | 3/2004 | Jones | |
| 6,786,453 B2 | 9/2004 | Jones | |
| 2002/0195595 A1 | 12/2002 | Shepherd | |

*Primary Examiner*—Tien Dinh
(74) *Attorney, Agent, or Firm*—Lee & Hayes, PLLC

(57) ABSTRACT

Apparatus and methods for attaching wall panels to support structures are disclosed. In one embodiment, an aircraft includes a support structure and a wall assembly coupled to the support structure. The wall assembly includes a first member and a second member. The first member is coupled to the support structure and has a first elongated coupling member. The second member has a head portion and a base portion. The head portion has at least one slot disposed therein that is adapted to receive an edge portion of the panel. The base portion includes a second elongated coupling member that is adapted to be coupled to the first elongated coupling member.

20 Claims, 4 Drawing Sheets

ATTACHING PANELS TO SUPPORT STRUCTURES IN AN AIRCRAFT

CROSS REFERENCE TO RELATED APPLICATIONS

This patent application is a divisional application of co-pending, commonly-owned U.S. patent application Ser. No. 11/067,076 entitled "Apparatus and Methods of Attaching Panels to Support Structures" filed Feb. 25, 2005, which is a continuation of U.S. Pat. No. 6,871,822 entitled "Apparatus and Methods of Attaching Panels to Support Structures", Guard et al., issued Mar. 29, 2005, which application and issued patent are hereby incorporated by reference.

FIELD OF THE INVENTION

The present disclosure relates to attachment of interior wall panels to support structures and, more specifically, to attachment of interior wall panels within aircraft.

BACKGROUND OF THE INVENTION

Many contemporary vehicles, especially those used for the transportation of passengers, are equipped with interior wall panels that are attached to a frame or other support structure of the vehicle. For example, the passenger compartments of most modern aircraft, trains, and buses are equipped with interior wall panels. Interior wall panels may improve the passenger's enjoyment by reducing noise or improving the aesthetic quality of the passenger's environment.

FIG. 1 is an isometric view of an aircraft interior 10 prior to installation of wall panels 12 (not shown) in accordance with the prior art. As shown in FIG. 1, the aircraft interior 10 includes a plurality of elongated frame members 14, and a plurality of isolation mounts 16 are attached to each frame member 14. An enlarged isometric view of one of the isolation mounts 16 is shown in FIG. 2. The isolation mount 16 includes a mounting plate 18 having a pair of elongated slots 20 disposed therethrough. A floating nut 21 is clipped to the mounting plate 18 near each of the elongated slots 20. Mounting arms 22 (only one visible) extend from the mounting plate 18 along the sides of the frame member 14 and are secured to the frame member 14 by a fastener 24 (e.g. a rivet, screw, etc.). During assembly, a wall panel 12 is positioned beside the mounting plate 18, with a pair of hole 24 in the wall panel 12 aligned with the floating nuts 21. A mounting screw 26 is then passed through each hole 24 and secured to the corresponding floating nut 21, securing the wall panel 12 to the frame member 14.

Although desirable results have been achieved using the prior art panel mounting system shown in FIGS. 1 and 2, some drawbacks have been noted. For example, for installation of wall panels 12 into the aircraft interior 10, each wall panel 12 typically uses about eighty parts to secure into position, including ten isolation mounts 16 with two fasteners 24 per isolation mount 16, two floating nuts 21 per isolation mount 16, eight mounting screws 26, and various other components. In addition, the process of installing the wall panels 12 using the prior art installation may involve multiple tools and more than one person to accomplish. Consequently, there is an unmet need to reduce the number of parts, tools, and personnel, and associated expenses to install wall panels within the aircraft interior.

SUMMARY OF THE INVENTION

The present invention is directed to apparatus and methods for attaching wall panels to support structures. Apparatus and methods in accordance with the present invention may advantageously provide a simplified, more efficient method for attaching panels to support structures, thereby improving the efficiency and reducing the expense involved in the installation process. The inventive apparatus and methods may also inhibit the transmission of structure-borne vibration from the support structure to the wall panels.

In one embodiment, an aircraft includes a support structure and a wall assembly coupled to the support structure. The wall assembly includes a first member and a second member. The first member is adapted to be coupled to the adjoining structure, and has a first elongated coupling member. The second member has a head portion and a base portion. The head portion has at least one slot disposed therein that is adapted to receive an edge portion of the panel. The base portion includes a second elongated coupling member adapted to be coupled to the first elongated coupling member.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus and methods for attaching wall panels to support structures. Many specific details of certain embodiments of the invention are set forth in the following description and in FIGS. 3-9 to provide a thorough understanding of such embodiments. One skilled in the art, however, will understand that the present invention may have additional embodiments, or that the present invention may be practiced without several of the details described in the following description.

Figure 1:
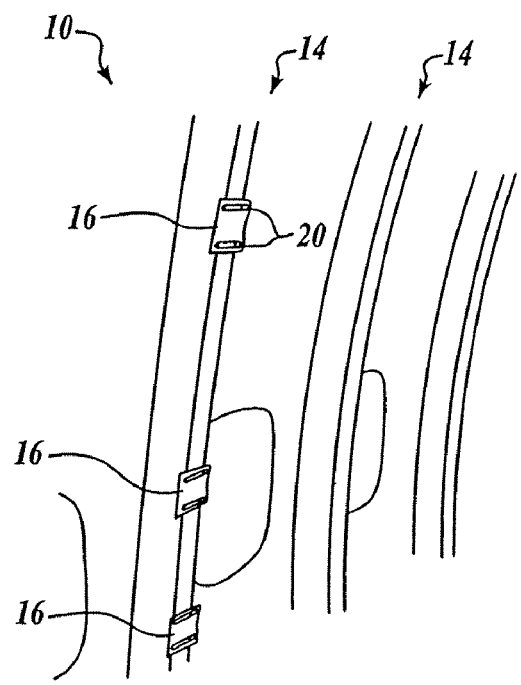
FIG. 1 is an isometric view of an aircraft interior prior to installation of wall panels in accordance with the prior art.
Figure 2:
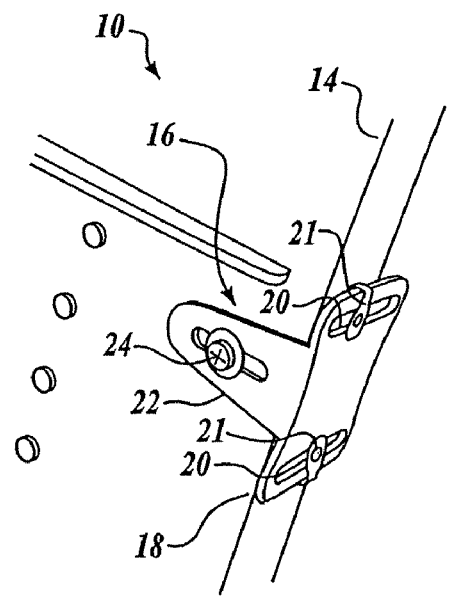
FIG. 2 is an enlarged isometric view of an isolation mount of the aircraft interior of FIG. 1.
Figure 3:
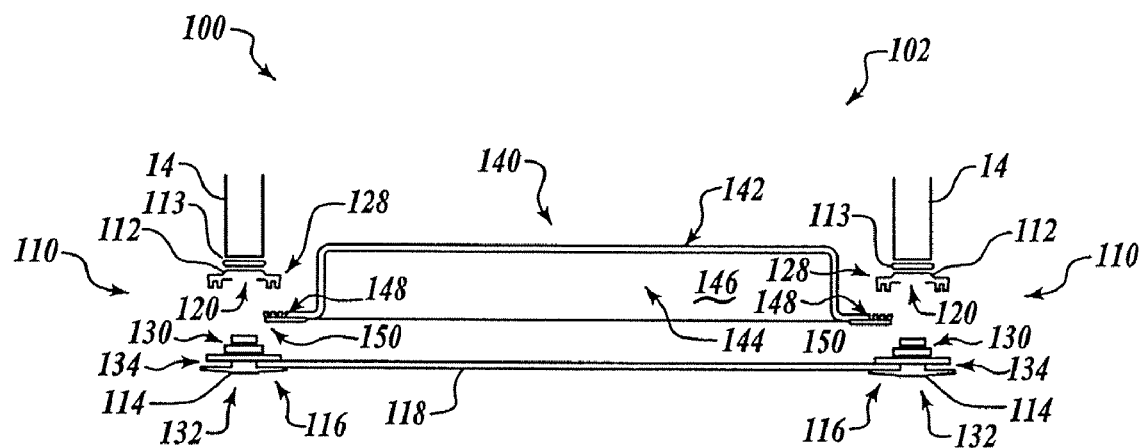
FIG. 3 is an exploded end elevational view of a panel mounting assembly in accordance with an embodiment of the invention.

FIG. 3 is an end elevational view of a panel mounting assembly 100 in an exploded (or disassembled) position in accordance with an embodiment of the invention. As shown in FIG. 3, the panel mounting assembly 100 includes a plurality of attachment assemblies 110. Each attachment assembly 110 includes a support member 112 that is coupled to an adjoining frame member 14, and a mounting member 114 that is coupled to an edge portion 116 of a panel 118. In one embodiment, for example, the frame member 14 may be part of an aircraft airframe, and the panel 118 may be an interior wall panel of a passenger compartment of the aircraft.

As further shown in FIG. 3, a mounting layer 113 may be disposed between the support member 112 and the frame member 14. The mounting layer 113 may be formed of any desirable material, such as an elastomeric material or other material suitable for damping or eliminating vibrations that may otherwise be transmitted from the frame member 14 to the support member 112. In one particular embodiment, the mounting layer 113 may be formed of an elastomeric material characterized by one or more of the following parameters: an elongation between 350% to 500%, a hardness durometer (D) between approximately 50 to 60, and a modulus of approximately 90,000 to 150,000 psi. In further embodiments, the mounting layer 113 may be formed of a commercially-available material known as HYTREL®, a thermoplastic elastomer (TPE), a siloxane compound, a modified silicone, or any other suitable material or combination of materials.

Figure 4:
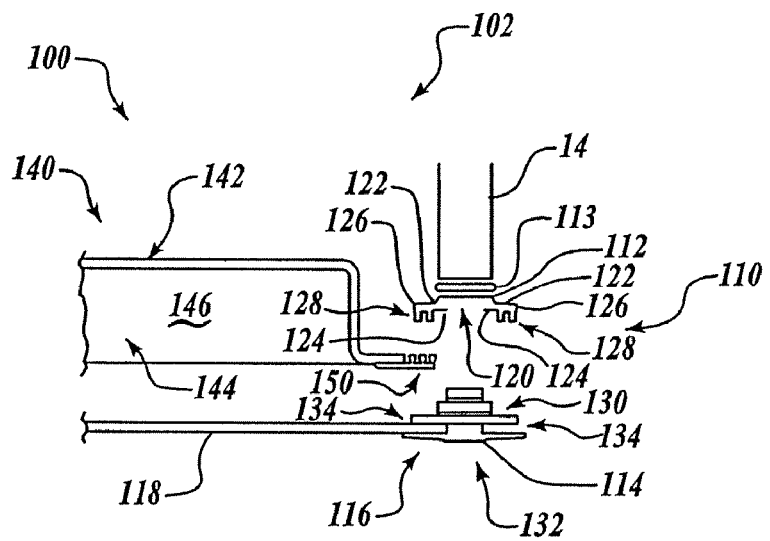
FIG. 4 is an enlarged elevational view of one of the attachment assemblies of the panel mounting assembly of FIG. 3.

FIG. 4 is an enlarged elevational view of one of the attachment assemblies 110 of the panel mounting assembly 100 of FIG. 3. As shown in FIG. 4, the support member 112 has an elongated channel 120 disposed therein. The channel 120 is bounded on either side by a sidewall member 122. In this embodiment, a retaining member 124 projects inwardly from an inner surface of each sidewall member 122 into the channel 120. Similarly, a mounting member 126 projects outwardly from an outer surface of each sidewall member 122. A first securing member (or fastener) 128 is disposed on each mounting member 126.

With continued reference to FIG. 4, the mounting member 114 includes a base portion 130 and a head portion 132. The base portion 130 projects outwardly from the head portion 132 and is adapted to engage with the elongated channel 120, as described more fully below. In this embodiment, the head portion 132 has a pair of slots 134 disposed therein. The slots 134 are disposed on opposing sides of the head portion 132 and are adapted to fittingly receive the edge portion 116 of the panel 118.

As further shown in FIGS. 3 and 4, the panel mounting assembly 100 may further include an insulation assembly 140 having a shell member 142 adapted to form a recess 144. An insulating material 146 may be formed in the recess 144. Each end 148 of the shell member 142 may include a second securing member 150 that is adapted to be coupled to the first securing member 128 of the support member 112. Thus, each attachment assembly 110 may be used to attach both the panel 118 and the insulation assembly 140 to the frame member 14.

It will be appreciated that the first and second securing members 128, 150 may be any type of suitable coupling members. In one embodiment, for example, the first and second securing members 128, 150 may be so-called tongue-in-groove or ZIP-LOC® type securing members as shown in FIGS. 3 and 4. In alternate embodiments, the first and second securing members 128, 150 may be snaps, hook-and-loop fastener strips (e.g. VELCRO® strips), adhesive, rivets, screws, or any other suitable securing or fastening devices.

Figure 5:
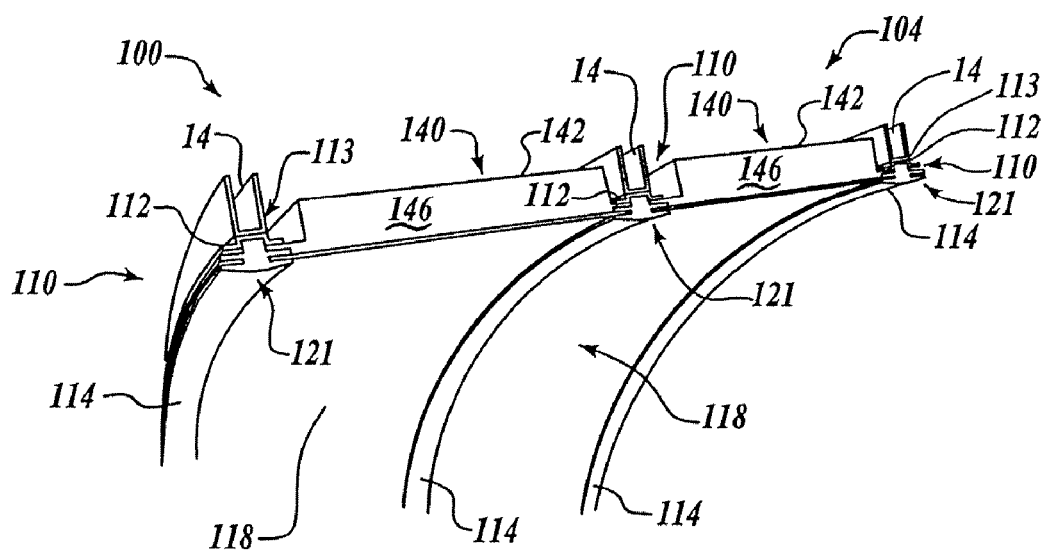
FIG. 5 is an isometric, partial sectional view of the panel mounting assembly of FIG. 3 in an assembled position.

FIG. 5 is an isometric, partial sectional view of the panel mounting assembly 100 of FIG. 3 in an assembled position. In the embodiment shown in FIG. 5, two panels 118 and two insulation assemblies 140 are mounted onto three frame members 14 using three attachment assemblies 110. The panel mounting assembly 100 may be assembled by attaching the support member 112 of each attachment assembly 110 to one of the frame members 14. The attachment of the support member 112 to the frame member 14 may be accomplished in any desired manner, including, for example, by rivets, screws, adhesive, thermal bonding, or using any other suitable attachment mechanism. As set forth above, the mounting layer 113 may be positioned between the frame member 14 and the support member 112 to reduce vibration, or alternately, the mounting layer may be omitted. In another embodiment, the support member 112 may be integrally formed with the frame member 14. The insulation assemblies 140 may then be installed by coupling the second coupling members 150 on the insulation assemblies 140 (FIG. 4) with the first coupling members 128 on the support member 112. In alternate embodiments, the insulation assemblies 140 may be coupled to the support members 112 prior to their attachment to the frame members 14, or alternately, the insulation assemblies 140 may be omitted.

The mounting members 114 may then be coupled to the panels 118 by inserting the edge portions 116 of the panels 118 into the slots 134. The mounting members 114 may then be coupled to the support members 112 by engaging the base portion 130 of each mounting member 114 into the channel 120 of the corresponding support member 112. Alternately, the panels 118 may be coupled to the mounting member 114 after the mounting member 114 is coupled to the support member 112, or a combination of these alternate possibilities may be employed.

The base portion 130 may be engaged into the channel 120 in a variety of suitable ways. For example, in one embodiment, the base portion 120 may be engaged into the channel 120 by slideably engaging the base portion 130 into an open end 121 of the channel 120 (FIG. 5). The base portion 130 may then be slid along a longitudinal axis 123 of the channel 120 until the mounting member 114 is properly positioned with respect to the support member 112 (e.g. aligned with the support member 112). Alternately, the mounting member 114 may be positioned near the support member 112, and the base portion 130 may simply be snapped or force-fit into the channel 120 of the support member 112.

In the assembled position, the base portion 130 may be adapted to engage with the cross-sectional shape of the channel 120 such that, under normal operating conditions, the base portion 130 is substantially constrained within the elongated channel 120 from movement relative to the support member 112 in directions other than along the longitudinal axis 123 of the channel 120. In the embodiment shown in FIGS. 3-5, for example, the base portion 130 is engaged into the channel 120 but is constrained from movement out of the channel 120 by the relatively narrow portion of the cross-sectional shape of the channel 120 created by the inwardly-projecting retaining members 124. The ends of the channel 120 may then be blocked, or the base portion 130 otherwise secured within the channel 120, to prevent undesired movement of the base portion 130 along the longitudinal axis 123 of the channel 120.

The panel mounting assembly 100 advantageously provides a simplified, more efficient method for attaching panels 118 to adjoining support structures 14. The number of parts involved in the installation is substantially decreased, along with the number of tools required for the operation, in comparison with the prior art. Overall, the efficiency of the process of installing panels within vehicles, including within the passenger compartments of aircraft, may be improved, and the amount of labor and expense involved in the operation reduced. The panel mounting assembly 100 may also reduce or eliminate structure-borne vibration that would otherwise be transmitted from the support structures 14 to the panels 118, which may further enhance passenger comfort within, for example, the interior of a passenger aircraft.

Figure 6:
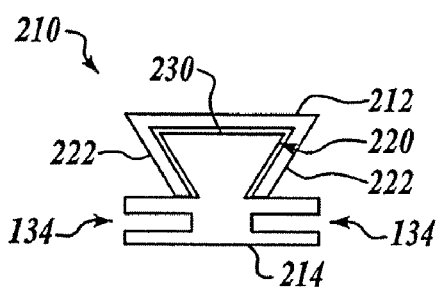
FIG. 6 is an enlarged end elevational view of an attachment assembly in accordance with an alternate embodiment of the invention.
Figure 7:
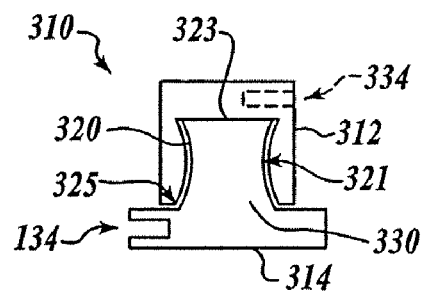
FIG. 7 is an enlarged end elevational view of an attachment assembly in accordance with yet another embodiment of the invention.

It will be appreciated that the invention is not limited to the particular embodiment of the attachment assembly 110 shown in FIGS. 3-5, and that the channel 120 and the base portion 130 may have a wide variety of suitable configurations. For example, FIGS. 6 and 7 show enlarged, end elevational views of attachment assemblies in accordance with alternate embodiments of the invention. In the embodiment shown in FIG. 6, the attachment assembly 210 includes a support member 212 having sloping sidewalls 222 that form a channel 220 having a partial (or truncated) triangular cross-sectional shape. Similarly, the mounting member 214 includes a correspondingly-shaped base portion 230. Furthermore, as shown in FIG. 7, the attachment assembly 310 may include a support member 312 that includes a channel 320 having a cross-sectional shape with a narrow portion 321 that is located at a position between a bottom wall 323 of the channel 320 and an outer opening 325 of the channel 320. The mounting member 314 may then include a base portion 330 having a corresponding cross-sectional shape. Of course, a wide variety of suitable cross-sectional shapes of channels and base portions may be used in accordance with the teachings of the present invention.

It should also be noted that the mounting assembly may be further modified such that the channel is disposed in the mounting member and the base portion that engages into the channel is part of the support member. For example, with reference to the embodiment shown in FIG. 7, the first member 314 may be coupled to an adjoining frame member 14 (FIGS. 3-5), and the second member 312 may include one or more slots 334 (shown in phantom lines) that engage with an edge portion of a panel 118. Thus, the second member 312 may be engaged onto the first member 314 in the manner described above to attach a panel 118 to the frame member 14.

Figure 8:
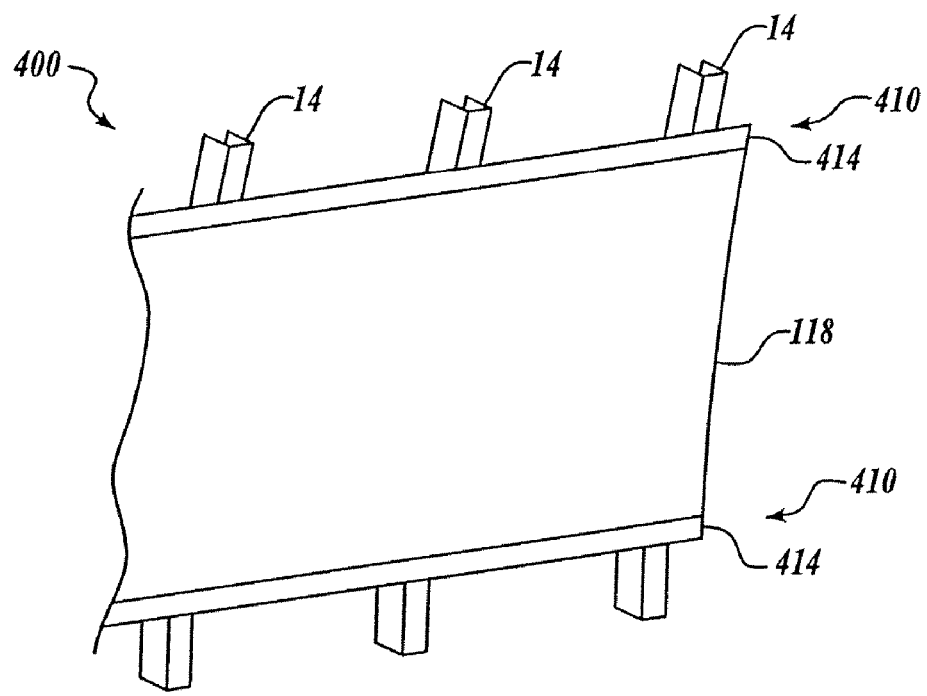
FIG. 8 is an isometric, partial sectional view of a panel mounting assembly in accordance with a further embodiment of the invention.

FIG. 8 is an isometric, partial sectional view of a panel mounting assembly 400 in accordance with another embodiment of the invention. In this embodiment, a pair of attachment assemblies 410 are mounted transversely to a plurality of frame members 14, and a panel 118 is mounted therebetween. Thus, the above-noted advantages of the invention may be realized in a panel mounting assembly 400 having attachment assemblies 410 that are transverse (e.g. perpendicular or otherwise) to the adjoining supporting members.

Although the above-noted embodiments have been described with reference to attachment to elongated frame members 14, the invention is not limited to operation with such members, and in fact can be used to attach panels to virtually any type of support structure, including, for example, flat walls or non-vertical frame members. The attachment and mounting assemblies of the present invention may be employed with support structures of virtually any design, construction, or material composition, including, for example, support structures made of aluminum, steel, thermoplastics, composites, or any other desired materials.

Figure 9:
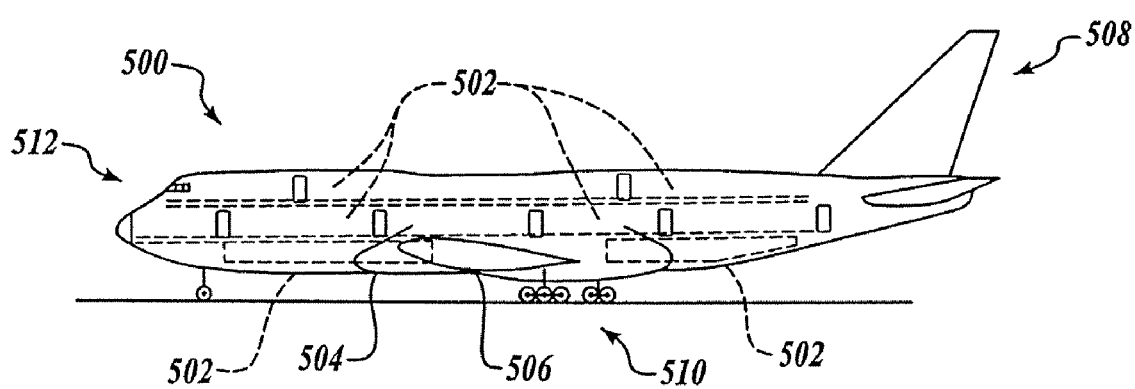
FIG. 9 is a side elevational view of an aircraft having wall panels installed using a panel mounting assembly in accordance with the invention.

FIG. 9 is a side elevational view of an aircraft 500 having wall panels 118 installed using a panel mounting assembly 502 (not visible) in accordance with the invention. All of the components of the aircraft 500, other than the panel mounting assembly 502 of the present invention, are of generally known construction and, for the sake of brevity, will not be described in detail herein. For example, the aircraft 500 includes one or more propulsion units 504, wings 506 (or other lifting surfaces), a tail assembly 508, a landing assembly 510, a control system 512 (not visible), and a host of other systems and subsystems that enable proper operation of the aircraft 500. The aircraft 500 shown in FIG. 9 is generally representative of a commercial passenger aircraft, including, for example, the 737, 747, 757, 767, and 777 models commercially-available from The Boeing Company. The apparatus and methods disclosed herein, however, may also be employed in any other types of aircraft, such as rotary aircraft or manned military aircraft, including those described, for example, in The Illustrated Encyclopedia of Military Aircraft by Enzo Angelucci, published by Book Sales Publishers, September 2001.

While certain embodiments of the invention have been illustrated and described, as noted above, many changes can be made without departing from the spirit and scope of the invention. Accordingly, the scope of the invention is not limited by the disclosure of the exemplary embodiments, but rather, the invention should be determined entirely by reference to the claims that follow.

What is claimed is:

1. An aircraft comprising:
   a support structure; and
   a wall assembly operatively coupled to the support structure, the wall assembly including:
      a panel having a first edge portion;
      a first member having a first elongated coupling member, the first member being coupled to the support structure; and
      a second member having a head portion and a base portion, the head portion having at least one slot disposed therein, the slot having a slot opening that is to receive an edge portion of the panel, the base portion having a second elongated coupling member to be coupled to the first elongated coupling member, wherein the first elongated coupling member comprises an elongated channel having an elongated channel opening along the longitudinal axis of the first elongated coupling member, and the second elongated coupling member includes an elongated projection to be engaged into the channel opening, the channel opening being non-parallel with the slot opening, wherein the elongated channel is defined by a pair of side surfaces, and a bottom surface extending between the side surfaces and spaced apart from the channel opening the side surfaces and bottom surface defining a cross-sectional shape having a narrowed portion that is spaced apart from the bottom surface.

2. The aircraft of claim 1, wherein the elongated channel has at least one open end, and wherein the elongated projection is slideably engageable into the open end and slideable along the longitudinal axis of the first elongated coupling member, the elongated projection being substantially constrained within the elongated channel from movement relative to the first member in directions other than along the longitudinal axis.

3. The aircraft of claim 1, wherein the first member is to be coupled to the support structure such that a longitudinal axis of the elongated channel is oriented at least partially along the adjoining structure.

4. The aircraft of claim 1, wherein the elongated channel opening is approximately perpendicular to the slot opening.

5. The aircraft of claim 1, wherein the head portion has first and second slots disposed in opposing sides thereof.

6. The aircraft of claim 1, wherein the head portion includes a substantially T-shaped portion having first and second outwardly extending portions, each outwardly extending portion having a slot disposed therein.

7. The aircraft of claim 1, wherein the support structure comprises a rib member of a wall structure, and wherein the slot opening is further to support the panel in a non-perpendicular orientation with respect to the wall structure.

8. The aircraft of claim 1, wherein the elongated projection of the second elongated coupling member is to force-fit into the elongated channel opening of the first elongated coupling member along the longitudinal axis.

9. The aircraft of claim 1, wherein the first member includes first and second sidewalls, the elongated channel being disposed between inner surfaces of the sidewalls, at least one of the first and second sidewalls having an outer surface including a mounting arm projecting outwardly from the sidewall, the mounting arm including a securing member.

10. An aircraft comprising:
a support structure; and
a wall assembly operatively coupled to the support structure, the wall assembly including:
a panel having a first edge portion;
a first member having a first elongated coupling member, the first member being coupled to the support structure; and
a second member having a head portion and a base portion, the head portion having at least one slot disposed therein, the slot having a slot opening that is to receive an edge portion of the panel, the base portion having a second elongated coupling member to be coupled to the first elongated coupling member, wherein the first elongated coupling member comprises an elongated channel having an elongated channel opening along the longitudinal axis of the first elongated coupling member, and the second elongated coupling member includes an elongated projection to be engaged into the channel opening, the channel opening being non-parallel with the slot opening, wherein the elongated channel is defined by a pair of side surfaces, and a bottom surface extending between the side surfaces and spaced apart from the channel opening, at least one of the side surfaces including a retaining member projecting inwardly into the elongated channel.

11. The aircraft of claim 10, wherein the elongated channel has at least one open end, and wherein the elongated projection is slideably engageable into the open end and slideable along the longitudinal axis of the first elongated coupling member, the elongated projection being substantially constrained within the elongated channel from movement relative to the first member in directions other than along the longitudinal axis.

12. The aircraft of claim 10, wherein the elongated channel is defined by a pair of side surfaces, and a bottom surface extending between the side surfaces and spaced apart from the channel opening the side surfaces and bottom surface defining a cross-sectional shape having a narrowed portion that is spaced apart from the bottom surface.

13. The aircraft of claim 10, wherein the elongated channel is defined by a pair of side surfaces, and a bottom surface extending between the side surfaces and spaced apart from the channel opening, at least one of the side surfaces including a retaining member projecting inwardly into the elongated channel.

14. The aircraft of claim 10, wherein the first member is to be coupled to the support structure such that a longitudinal axis of the elongated channel is oriented at least partially along the adjoining structure.

15. The aircraft of claim 10, wherein the elongated channel opening is approximately perpendicular to the slot opening.

16. The aircraft of claim 10, wherein the head portion has first and second slots disposed in opposing sides thereof.

17. The aircraft of claim 10, wherein the head portion includes a substantially T-shaped portion having first and second outwardly extending portions, each outwardly extending portion having a slot disposed therein.

18. The aircraft of claim 10, wherein the support structure comprises a rib member of a wall structure, and wherein the slot opening is to further support the panel in a non-perpendicular orientation with respect to the wall structure.

19. The aircraft of claim 10, wherein the elongated projection of the second elongated coupling member is to force-fit into the elongated channel opening of the first elongated coupling member along the longitudinal axis.

20. The aircraft of claim 10, wherein the first member includes first and second sidewalls, the elongated channel being disposed between inner surfaces of the sidewalls, at least one of the first and second sidewalls having an outer surface including a mounting arm projecting outwardly from the sidewall, the mounting arm including a securing member.

* * * * *